(12) United States Patent
Thomas et al.

(10) Patent No.: US 7,002,169 B2
(45) Date of Patent: Feb. 21, 2006

(54) METHOD FOR GENERATING PHOTONS BY SONOLUMINESCENCE

(75) Inventors: Jean-Louis Thomas, Villejuif (FR); Mathias Fink, Meudon (FR)

(73) Assignee: Centre National de la Recherche Scientific-CNRS, (FR)

( * ) Notice: Subject to any disclaimer, the term of this patent is extended or adjusted under 35 U.S.C. 154(b) by 350 days.

(21) Appl. No.: 10/468,464

(22) PCT Filed: Feb. 27, 2002

(86) PCT No.: PCT/FR02/00713

§ 371 (c)(1),
(2), (4) Date: Aug. 20, 2003

(87) PCT Pub. No.: WO02/074021

PCT Pub. Date: Sep. 19, 2002

(65) Prior Publication Data

US 2004/0065624 A1    Apr. 8, 2004

(30) Foreign Application Priority Data

Mar. 12, 2001 (FR) .................................. 01 03320

(51) Int. Cl.
*B03C 1/00* (2006.01)
*B03C 1/02* (2006.01)
*A61N 5/06* (2006.01)

(52) U.S. Cl. .............................. 250/504 R; 250/493.1; 250/494.1; 250/503.1; 210/85; 210/748

(58) Field of Classification Search .................... None
See application file for complete search history.

(56) References Cited

U.S. PATENT DOCUMENTS

| | | | | |
|---|---|---|---|---|
| 5,525,041 A | * | 6/1996 | Deak | 417/63 |
| 5,982,801 A | * | 11/1999 | Deak | 372/69 |
| 6,193,878 B1 | * | 2/2001 | Morse et al. | 210/85 |
| 6,216,538 B1 | * | 4/2001 | Yasuda et al. | 73/570.5 |
| 6,234,765 B1 | * | 5/2001 | Deak | 417/321 |
| 2001/0003800 A1 | * | 6/2001 | Crowley | 607/88 |
| 2003/0016716 A1 | * | 1/2003 | Mahonty | 372/55 |
| 2003/0194692 A1 | * | 10/2003 | Purdum | 435/2 |
| 2004/0065624 A1 | * | 4/2004 | Thomas et al. | 210/748 |
| 2005/0006813 A1 | * | 1/2005 | Yamane et al. | 264/211.21 |

OTHER PUBLICATIONS

Bernard et al., "Trapping of Single Bubbles in Cryogenic Fluids", Physica B 194-196 (1994) pp. 165-166 XP-001033427.

Wu et al., "A model of sonoluminescence", Proc. R. Soc. Lond. A. (1994) 445, pp. 323-349, XP-001033423.

Ciuti et al., "Enhancement of high-frequency acoustic cavitation effects by a low-frequency stimulation", Ultrasonics Sonochemistry 4 (1997) pp. 263-268.

Chodos et al., "Modeling sonoluminescence", Physical Review E, vol. 59, No. 3, Mar. 1999, pp. 3001-3007, XP-002182901.

* cited by examiner

Primary Examiner—John R. Lee
Assistant Examiner—Bernard E. Souw
(74) Attorney, Agent, or Firm—Stites & Harbison; Douglas E. Jackson

(57) ABSTRACT

A method of generating photons by sonoluminescence, from a gas bubble trapped in a liquid reservoir (2) by a standing ultrasound wave. An ultrasound impulse emitted by high-frequency transducers (T1–T8) is superposed on the standing wave, the high-frequency transducers being pre-focused onto the gas bubble and pre-synchronized with the light emissions from the gas bubble during an initial training stage in which said focusing and said synchronization are optimized.

13 Claims, 3 Drawing Sheets

METHOD FOR GENERATING PHOTONS BY SONOLUMINESCENCE

The present invention relates to methods of generating photons by sonoluminescence.

More particularly, the invention relates to a method of generating photons by sonoluminescence, said method comprising at least the following steps:

(a) generating at least one standing acoustic wave in a liquid reservoir, said standing acoustic wave having at least one antinode;

(b) trapping at least one gas bubble in the liquid at said antinode of the standing acoustic wave, said gas bubble then being subjected to a periodic deformation cycle comprising expansion stages and contraction stages in alternation; and (e) generating acoustic wave impulses in the liquid, which compression acoustic wave impulses are superposed on the standing acoustic wave, and cause photons to be emitted by the gas bubble, by sonoluminescence.

A method of this type is described by Moss et al., who performed digital simulations of the behavior of a deuterium bubble under the action of a sinusoidal standing acoustic wave on which an acoustic wave impulse was superposed ("Sonoluminescence and the prospects for table-top microthermonuclear fusion", Physics Letters A 211 (1996) 69–74, Elsevier North Holland, Feb. 5, 1996). According to Moss et al., the acoustic wave impulse superposed on the sinusoidal wave makes it possible to increase photon emission by the gas bubble, and could even lead to conditions making it possible to trigger a thermonuclear fusion reaction.

However, those theoretical results prove impossible to implement with compression wave impulses having large amplitudes because it is then impossible to apply to the gas bubble compression acoustic waves having amplitudes greater than 1.4 bars. Otherwise the gas bubble "disintegrates" and disappears without generating any photons.

A particular object of the present invention is to mitigate those drawbacks so that, when necessary, it is possible to apply to the gas bubble acoustic waves of amplitude significantly greater than 1.4 bars.

More generally, an object of the invention is to provide a method of the above-mentioned type that makes it possible to amplify the phenomenon of sonoluminescence.

To this end, according to the invention, a method of the type in question is characterized:

in that the acoustic wave impulses are caused to be emitted by a number n of not less than 2 impulse firing transducers disposed around the gas bubble in that a focusing training step (c) and a synchronization step (d) are interposed between the steps (b) and (e); and in that, during the focusing training step (c), the impulse firing transducers are caused to emit acoustic wave impulses with a first amplitude that is sufficiently small to avoid disturbing significantly the position and the deformation cycle of the gas bubble, acoustic signals generated by said acoustic wave impulses in the liquid reservoir are measured, and time offsets are deduced therefrom to be applied to respective ones of the acoustic wave impulses generated by the various impulse firing transducers so as to focus said acoustic wave impulses onto the gas bubble;

in that, during the step (d), instants at which acoustic wave impulses are emitted by the various impulse firing transducers are determined so that each wave impulse generated by the impulse firing transducers reaches the gas bubble either during a contraction stage if the wave impulse is a compression wave, or during an expansion stage if the wave impulse is an expansion wave; and in that, during the step (e) the impulse firing transducers are caused to generate the acoustic wave impulses at the respective emit instants determined at the step (d), with a second amplitude that is larger than the first amplitude.

By means of these provisions, it is thus possible to obtain a significant increase in the energy emitted by the gas bubble in the form of photons, for any given energy of the acoustic wave impulse. In addition, the second amplitude of the acoustic wave impulse may optionally be very much greater than 1.4 bars without destroying the gas bubble before it emits photons.

In preferred embodiments of the invention, any of the following provisions may optionally be used:

the step (c) comprises the following sub-steps:

(c1) each impulse firing transducer is caused to emit an acoustic wave impulse in succession, with said first amplitude;

(c2) after each acoustic wave impulse emission, each impulse firing transducer is caused to measure the acoustic signals $s3_{ij}(t)$ generated by said acoustic wave impulse propagating in the liquid reservoir, and said measured signals are stored, i and j being indices respectively designating the impulse firing transducer that emitted the acoustic wave impulse and the impulse firing transducer that received the acoustic wave impulse corresponding to each measured signal $s3_{ij}(t)$ ; and (c3) at least on the basis of said measured signals $s3_{ij}(t)$, said time offsets to be applied to respective ones of the acoustic wave impulses generated by the various impulse firing transducers are determined so as to focus said acoustic wave impulses onto the gas bubble;

during the sub-step (c3), travel times taken by the acoustic wave impulses to travel between each impulse firing transducer and the gas bubble are determined, and said time offsets to be applied to respective ones of the acoustic waves generated by the various impulse firing transducers so as to focus said acoustic wave impulses onto the gas bubble are deduced from said travel times;

a preliminary calibration step (a0) is performed, at least before the step (b), said calibration step comprising the following sub-steps:

(a01) each impulse firing transducer is caused to emit an acoustic wave impulse in succession, with said first amplitude;

(a02) after each acoustic wave impulse emission, each impulse firing transducer is caused to measure acoustic signals $s1_{ij}(t)$ generated by said acoustic wave impulse propagating in the liquid reservoir, and said measured signals $s1_{ij}(t)$ are stored;

during step (c) each impulse firing transducer is caused to listen to the acoustic signals $s2_j(t)$ received while the standing acoustic wave is being emitted in the presence of the gas bubble;

and during the sub-step (c3), corrected signals $s_{ij}(t)=s3_{ij}(t)-s1_{ij}(t)-s2_j(t)$ are calculated, and then said time offsets are determined on the basis of said corrected signals;

said time offsets are determined by cross-correlation between said corrected signals;

n is at least equal to 8;

the acoustic wave impulses are compression acoustic wave impulses, and, during the step (d), emit instants are determined at which the compression acoustic wave impulses are emitted by the various impulse firing transducers so that each compression acoustic wave impulse generated by the impulse firing transducers reaches the gas bubble during a contraction stage;

during step (d), emission of the compression acoustic wave impulses by the various impulse firing transducers is synchronized with the deformation cycle followed by the gas bubble so that said compression acoustic wave impulses generate an increase in the pressure of the liquid surrounding the gas bubble at least until the end of said contraction stage;

during step (d), emission of the compression acoustic wave impulses by the various impulse firing transducers is synchronized with the deformation cycle followed by the gas bubble, so that each compression acoustic wave impulse generated by the impulse firing transducers reaches the gas bubble substantially when said gas bubble has its maximum diameter;

the compression acoustic waves generate acoustic vibration of amplitude at least equal to 8 bars in the liquid in the vicinity of the gas bubble;

during step (e), the compression acoustic wave impulse coming from each impulse firing transducer is caused to be preceded immediately by an expansion acoustic wave impulse which is adapted to reach the gas bubble during the expansion stage preceding the contraction stage during which said gas bubble receives the compression acoustic wave impulses;

the standing acoustic wave is caused to be generated by at least two standing wave generation transducers distinct from the impulse firing transducers; and the standing acoustic wave is an ultrasound wave of frequency lying in the range 20 kilohertz (kHz) to 30 kHz and of amplitude in the vicinity of 1.3 bars.

Other characteristics and advantages of the invention will appear on reading the following description of one of its implementations, given by way of non-limiting example, and with reference to the accompanying drawings.

Figure 1:
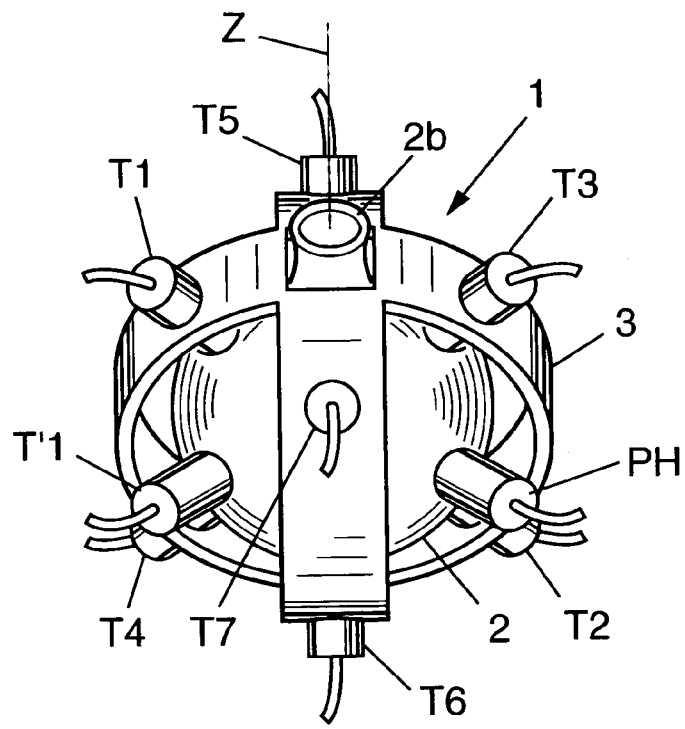
FIG. 1 is a perspective view of an embodiment of the device that makes it possible to implement the method of the invention.
Figure 2:
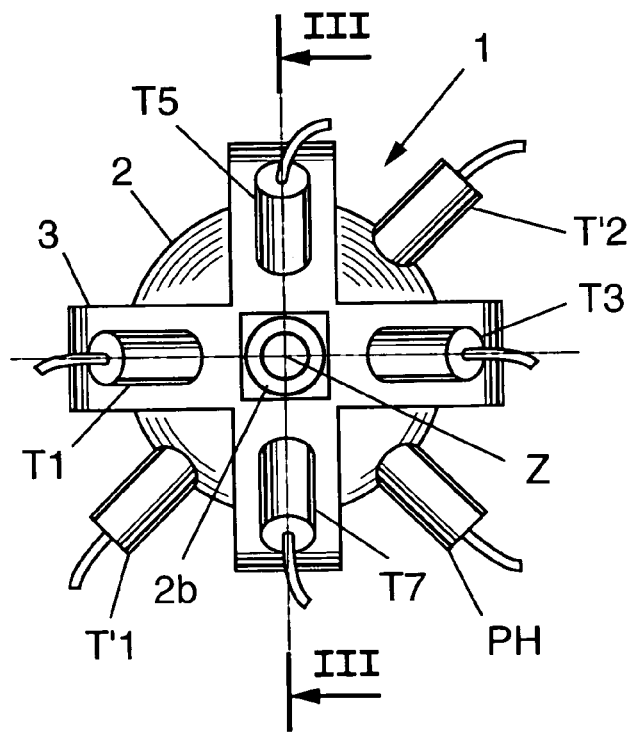
FIG. 2 is a plan view of the device of FIG. 1.
Figure 3:
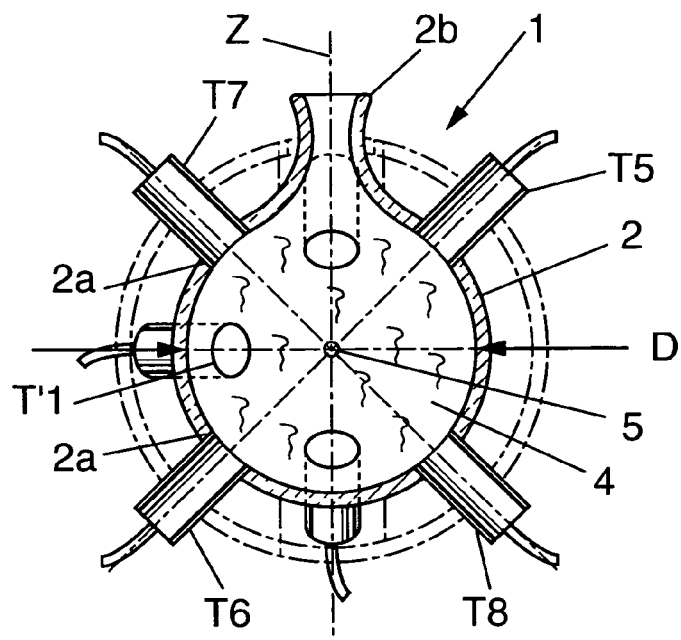
FIG. 3 is a section view on line III—III of FIG. 2.
Figure 4:
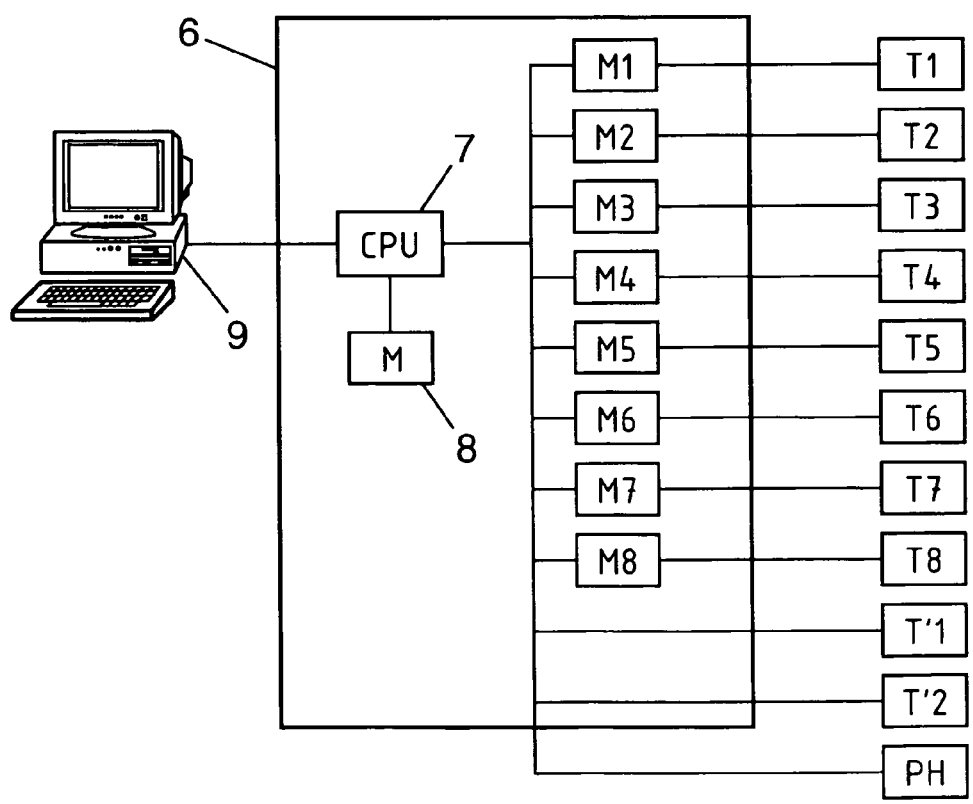
Figure 5:
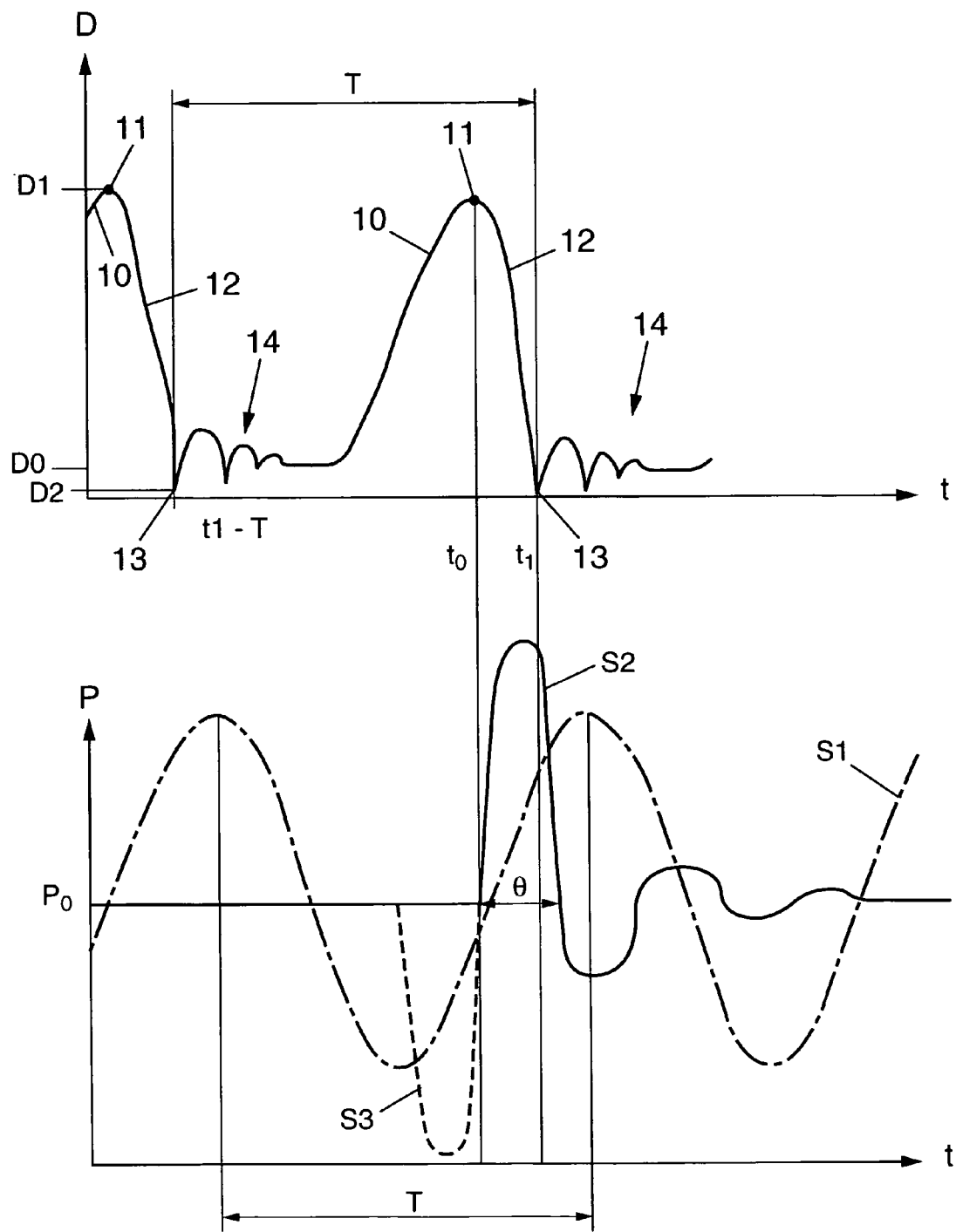

FIG. 4 is a block diagram showing the control system of the device of FIGS. 1 to 3; and FIG. 5 shows firstly the diameter P of the gas bubble contained in the device of FIGS. 1 to 3, over time t, and secondly the pressure P generated by the standing acoustic wave S1 and by the acoustic wave impulses S2 over time t in the vicinity of the gas bubble (the curves shown in FIG. 5 are not to scale and they merely give a diagrammatic indication of the variations in the diameter D and in the pressures P over time).

In the various figures, like references designate elements that are identical or similar.

FIGS. 1 to 3 show an example of a sonoluminescence device 1 which includes a reservoir 2 such as a spherical glass flask filled with water and around which two low-frequency ultrasound transducers T′1 and T′2 and eight high-frequency ultrasound transducers (or "impulse firing transducers") T1–T8 are disposed, as is a photomultiplier PH.

In the example shown, the eight high-frequency ultrasound transducers T1–T8 are supported by a rigid metal frame 3 which also supports the reservoir 2.

Advantageously, the various transducers T1–T8, T′1, T′2 are engaged in leaktight manner in orifices 2a provided in the wall of the reservoir 2 (see FIG. 3) so as to optimize the efficiency of said transducers.

The two low-frequency transducers T′1, T′2 are piezoelectric transducers adapted to emit a sinusoidal ultrasound wave at a frequency lying in the range 20 kHz to 30 kHz, and advantageously at about 25 kHz.

In this example, the reservoir 2 is of substantially spherical shape and is provided with a top neck 2b centered on a vertical axis Z. The reservoir 2 has a diameter D such that it forms a resonant cavity tuned to the frequency of the low-frequency transducers T′1, T′2. Naturally, the reservoir 2 could be of a different shape, e.g. of cylindrical shape or of rectangular block shape.

In the example considered, the diameter D of the reservoir 2 may, for example, be equal to 6 centimeters (cm), so that the center of the reservoir 2 forms an antinode for the standing acoustic wave generated by the transducers T′1 and T′2.

Thus, when the reservoir 2 is filled with liquid, e.g. degassed water, and when a gas bubble is injected into the reservoir 2 in the vicinity of its center (e.g. by means of a syringe), said bubble 5 remains trapped at the antinode, i.e. at the center of the reservoir (see FIG. 3). For example, the gas contained in the bubble 5 may be air, or deuterium, or else some other gas.

Preferably, the transducers T′1, T′2 generate a standing acoustic wave that has an amplitude sufficient for the gas bubble 5 to emit photons cyclically by sonoluminescence, as explained below.

The light intensity of the photon emissions can be measured by means of the photomultiplier PH.

Furthermore, the eight high-frequency acoustic transducers T1–T8 are distributed three-dimensionally around the center of the reservoir 2, i.e. around the position of the gas bubble 5, and they are directed towards said gas bubble.

In the example in question, the eight high-frequency transducers are disposed in two vertical planes which are perpendicular to each other, and each of which contains the axis Z, each of the two plans being disposed at 45° relative to the common direction of the low-frequency transducers T′1, T′2.

In addition, also in the example in question, the high-frequency transducers T1–T8 are disposed in pairs of diametrically opposite high-frequency transducers, the common direction of each pair of diametrically opposite high-frequency transducers T1–T2, T3–T4, T5–T6, T7–T8 being disposed at 45° relative to the axis Z.

In addition, the common axis of each pair of diametrically opposite high-frequency transducers is perpendicular to the common axis of the other pair of diametrically opposite high-frequency transducers belonging to the same vertical plane.

Naturally, other configurations may be adopted for the high-frequency transducers T1–T8 provided that they are distributed three-dimensionally around the gas bubble 5. Furthermore, the number of high-frequency transducers could be different from eight. Thus, it is possible to implement the present invention with at least two diametrically opposite high-frequency transducers, or with at least four high-frequency transducers angularly positioned to converge on the gas bubble 5. In addition, the number of high-frequency transducers could also be greater than eight.

The high-frequency transducers used in the example considered herein are piezoelectric transducers emitting at a frequency of 700 kHz, and they are adapted to emit a compression acoustic wave impulse.

As shown in FIG. 4, the various transducers T1–T8, T'1, T'2 are connected to a control device which, in the example considered herein, comprises an electronics rack 6 that may itself be controlled by a microcomputer 9. The electronics rack 6 includes an electronic central processing unit (CPU) 7 associated with a central memory (M) 8, and adapted to control the low-frequency transducers T'1, T'2 and to receive the measurements from the photomultiplier PH (the central processing unit 7 can then use its internal clock or an external clock to determine the instants at which the light flashes are emitted by the gas bubble 5 while sonoluminescence is taking place). In addition, the central processing unit 7 is also connected, via buffer memories M1–M8, to the high-frequency transducers T1–T8 so as to be able to control said transducers so that the signals picked up by said transducers while they are operating in receive mode can be stored in the memories M1–M8.

The above-described device operates as follows.

Firstly, before the gas bubble 5 is injected into the reservoir 2, an initial calibration step is performed, preferably while the low-frequency transducers T'1, T'2 are in operation. During this calibration step, each of the high-frequency transducers T1–T8 in succession is caused to emit a compression acoustic wave impulse that has a first amplitude that is relatively small (e.g. about 30 kilopascals (kPa)), and the resulting acoustic signal is measured by all of the high-frequency transducers T1–T8. The 64 signals $s1_{ij}(t)$ measured in this way are stored in memories M1–M8 (the indices i designate respective transducers that have emitted respective ones of the wave impulses, and the indices j designate respective transducers that have received respective ones of the wave impulses)

Subsequently, the gas bubble 5 is injected into the reservoir 2 while the low-frequency transducers T'1, T'2 continue to generate the above-mentioned low-frequency standing acoustic wave, which results in a sinusoidal pressure signal S1 at the bubble 5, as shown in FIG. 5. Under the effect of the standing wave, the gas bubble 5 is stabilized at the center of the reservoir 2 so that said bubble is substantially equidistant from the various transducers T1–T8, T'1, T'2 in the example in question.

The amplitude of said standing wave is preferably about 1.3 bars in the liquid in the vicinity of the gas bubble 5, so that the gas bubble 5 emits photons by sonoluminescence, because of the deformations that are imposed on it by the standing acoustic wave. As shown in FIG. 5, the diameter D of the gas bubble 5 varies considerably between a maximum diameter D1 which may, for example, lie approximately in the range 30 micrometers ($\mu$m) to 80 $\mu$m for a diameter at rest D0 of about 3 $\mu$m, and a minimum diameter D2 which may be about 0.5 $\mu$m in the example in question.

These variations in diameter take place in periodic cycles having the same period T as the standing sinusoidal wave S1 with expansion stages 10 in which the curve D(t) rises to a peak 11 alternating with contraction stages 12 in which the curve D(t) falls suddenly to a cusp 13 at the minimum diameter D2, which cusp is generally followed by a certain number of bounces 14 before the beginning of the following expansion stage 10.

The gas contained in the bubble 5 emits photons at the end of each contraction stage 13, during a very short period, e.g. lying in the range 10 picoseconds (ps) to 300 ps, depending on circumstances, under the effect of the sudden densification of the matter inside the bubble 5, and of the concomitant increase in the temperature and in the pressure inside said gas bubble 5, which increase in temperature and in pressure is sufficient to generate a plasma temporarily in the gas bubble. These light flashes are emitted by the gas bubble 5 with exact regularity, with the same period T as the standing acoustic wave.

Once the gas bubble 5 is stabilized at the center of the reservoir 2, a focusing training step is performed.

During this focusing training step, each transducer Ti is caused to measure the signal $s2_i(t)$ that it receives due to the standing acoustic waves in the presence of the gas bubble 5.

This measurement is effected in a time slot of duration T0 and starting, for each transducer Ti, at an instant $t0i=t0+\Delta\tau_i0$, where:

t0 is an instant at which the diameter of the gas bubble is at its maximum (this instant is known by measuring the instants t1 at which the light flashes are emitted by the gas bubble 5, and by the shape of the curve D(t) which is known in advance) ; and $\Delta\tau_i0$ is a first approximation of the travel time taken by the acoustic wave impulse to travel between the transducer Ti and the gas bubble 5 (in the example in question, in which the reservoir 2 is spherical and the bubble 5 is at the center of the sphere of radius R, all of the times $\Delta\tau_i0$ may be taken to be equal to R/c, where c is the speed of the acoustic wave in the liquid that fills the reservoir 2).

After each listening period during which a transducer Ti listens, the same transducer Ti is caused to emit a compression wave impulse S2 (see FIG. 5) with said first amplitude, which is sufficiently low (e.g. 30 kPa) to avoid displacing the bubble 5 or interfering with its cyclic deformations. This emission is performed such that the wave impulse reaches the gas bubble 5 at an instant at which its diameter D is at its maximum, so as to maximize the return signal reflected by the gas bubble (in other words, the transducer Ti emits its acoustic wave impulse at an instant $t0+k.T-\Delta\tau_i0$, where k is a non-zero natural integer [for example, k may be equal to 2] and T is the period of the standing acoustic wave).

The resulting acoustic signal $s3_{ij}(t)$ is then measured at each high-frequency transducer Tj during a time slot of duration T0 and starting at the instant $t0'i=t0i+k.T$, and the measured signal $s3_{ij}(t)$ is stored in the corresponding buffer memory Mj.

The same signal measurements $s2_i(t)$, $s3_{ij}(t)$ are effected successively for all of the transducers Ti, while leaving sufficient relaxation time Tr between each acoustic wave impulse fired by a transducer Ti and the measurement of the signal $s2_{i+i}(t)$ for the following transducer Ti+1.

For example, the relaxation time Tr may be about 150 milliseconds (ms) in the example in question, or, more generally greater than or equal to Q.T, where Q is the quality factor of the acoustic cavity formed by the reservoir 2 filled with liquid, and T is the period of the standing acoustic waves.

The various signals $s2_i(t)$, $s3_{ij}(t)$ all have the same duration T0 and are in phase relative to the reflection or to the emission of the acoustic waves by the gas bubble 5. For reasons of simplification, t may be taken to be equal to 0 at the beginning of each time slot, so that all of the signals $s2_i(t)$, $s3_{ij}(t)$ start at t=0 and end at t=T0.

In order to be consistent with the signals $s2_i(t)$ $s3_{ij}(t)$, the signals $s1_{ij}(t)$ measured previously may also be measured in time slots starting $2.\Delta\tau_i0$ after the acoustic wave impulse has been emitted by each transducer Ti, and by convention, t may also be taken to be equal to 0 at the beginning of each time slot, so that all of the signals $s1_{ij}(t)$ start at t=0 and end at t=T0.

When all of the acoustic signals have been measured, 64 time signals $s3_{ij}(t)$ are obtained, from which the previously measured time signals $s1_{ij}(t)$ and $s2_j(t)$ are subtracted, so as to obtain the signals $s_{ij}(t)=s3_{ij}(t)-s1_{ij}(t)-s2_j(t)$, where i is the index of the transducer Ti that emits the signal and j is the index of the transducer that receives the signal.

Naturally, it is possible firstly to measure all of the signals $s2_j(t)$ simultaneously or almost simultaneously in time slots beginning at instants $t0i=t0+\Delta\tau_i 0$ (the instants ti0 may optionally coincide if all of the transducers are equidistant from the bubble) and of duration T0, and then to measure the signals $s3_{ij}(t)$ successively in time slots of duration T0 and starting at $t0i+k1.T$, $t0i+k2.T$, $t0i+k3.T$, etc.

Once the signals $s_{ij}(t)$ have been determined, a cross-correlation method or any other known method is used to deduce from them the exact travel time $\Delta\tau_i$ taken by the ultrasound wave impulses to travel between each high-frequency transducer Ti and the gas bubble 5, for the specific position occupied by the gas bubble.

By way of non-limiting example, it is possible to calculate the following cross-correlation functions:

$$c_{ij}(\tau) = \int s_{ij}(t) * S_r(\tau+t) dt$$

where i and j are indices lying in the range 1 to 8 in the example in question, designating the transducers T1–T8, and $s_r(t)$ is a reference time signal, corresponding for example, to the transceiver response of an impulse firing transducer.

By way of example, it is possible to measure $s_r(t)$ once and for all by causing an acoustic impulse to be fired by one of the transducers T1–T8 into the liquid in the absence of any bubble 5, and by causing the acoustic signal received by the diametrically opposite transducer T1–T8 to be measured, said signal being multiplied by −1 to constitute the reference signal $s_r(t)$. At the same time, the time $\Delta T$ between the beginning of the emission of the acoustic impulse by the first transducer and the beginning of its reception by the diametrically opposite transducer is also measured.

After the cross-correlation functions $C_{ij}(\tau)$ have been calculated, the values of $\tau_{ij}$ that respectively maximize said functions are determined (this optimization may, for example, be considered to be performed when each of the cross-correlation functions has a value greater than 0.8), then the above-mentioned travel times $\Delta\tau_i$ are calculated, e.g. by the following formula:

$$\Delta\tau_i = \frac{1}{M} \sum_{j=1}^{M} \frac{(\tau_{ij} + \tau_{ji} - \tau_{jj})}{2} + \Delta t$$

where M is the number of transducers taken into account in said calculation (certain transducers are generally omitted from said calculation, in particular those that are situated facing each other, and those for which the direct wave arrives at the same time as the diffused wave).

Optionally, it is possible simplify said calculation by using the following formula: $\Delta\tau_i = \tau_{ii}/2 + \Delta T$.

On the basis of the travel times $\Delta\tau_i$, it is possible to deduce time offset values to be applied to the acoustic signals emitted by the various high-frequency transducers T1–T8, so that all of the acoustic wave impulses emitted by said high-frequency transducers arrive at the bubble 5 at the same time. Thus, to make all of the acoustic impulses from the transducers T1–T8 arrive at the gas bubble an instant t0, said impulses are emitted at respective instants $t0 - \Delta\tau i$ by the various transducers Ti. In other words, it is possible to focus the acoustic wave impulses emitted by the transducers T1–T8 on the bubble 5, at the specific position occupied by said bubble 5.

In addition, the arrival instant t0 at which the wave impulses arrive at the gas bubble 5 is determined so as to coincide with the bubble being in a contraction stage.

This synchronization may be performed by detecting the instants t1 at which the light flashes are emitted by the gas bubble 5 under the effect of the standing acoustic wave. The flashes are emitted very regularly so that, once an instant t1 has been determined, it is known that the subsequent flash emissions will take place at instants $t1+n.T$, where n is a natural integer, and T is the period of the standing acoustic wave. In addition, the curve D(t) giving the diameter of the gas bubble 5 as a function of time is itself entirely known and repetitive so that knowledge of the instant t1 makes it possible to know said curve. it is thus possible to determine the instant t0 at which it is desired for the compression wave impulses emitted by the transducers T1–T8 to arrive simultaneously on the bubble 5.

Advantageously, said instant t0 may be chosen to correspond to a maximum of the curve D(t) shown in FIG. 5.

Since the duration $\theta$ of the compression ultrasound impulse is known (e.g. about 700 nanoseconds (ns)), it is also possible to choose the instant t0 so that the signal S2 generates compression of the bubble 5 for most of the contraction stage 12 of the bubble and so that the increase in pressure generated in this way continues at least until the light emission instant t1.

Once the instant t0 has been determined, it is possible, at the respective instants $t0 - \Delta\tau_i$, to trigger firing of compression ultrasound impulses S2 by the various transducers T1–T8, with a second amplitude that is very much larger than the first amplitude. For example, the total amplitude of the pressure variation in the liquid in the vicinity of the bubble 5 may then be about 8 bars, or even much larger.

By focusing the wave impulses emitted in this way, the gas bubble 5 is not destroyed. In addition, a considerable increase is observed in the intensity of the light emitted by the gas bubble 5 at the moment at which the compression ultrasound impulse is applied. By way of example, for a compression ultrasound impulse amplitude of about 8 bars in the liquid in the vicinity of the gas bubble 5, the intensity of the light emitted by sonoluminescence is observed to increase by a factor of 2 relative to the intensity emitted in the presence of the standing acoustic wave alone.

It should be noted that it is possible to increase the energy produced by the gas bubble 5 by sonoluminescence even further by increasing the amplitude of the compression ultrasound impulse, which can be obtained by increasing the power of the high-frequency transducers T1–T8 and/or the number of said transducers.

In addition, it is possible to increase the energy emitted by sonoluminescence even further by causing the compression ultrasound impulse S2 to be preceded immediately by an expansion ultrasound impulse S3, i.e. a sudden drop in pressure to below the static pressure P0 prevailing in the reservoir 2 (see FIG. 5) during the expansion stage 10 of the gas bubble 5, which stage immediately precedes the contraction stage 12 during which the compression ultrasound impulse S2 is applied. Naturally, the impulses S2 and S3 may be emitted by the same transducers T1–T8.

It should be noted that, the transducers T'1, T2 may optionally be omitted, the transducers T1–T8 then serving both:

to generate a standing wave which holds the gas bubble 5 in position and causes its diameter to vary cyclically; and to generate compression and/or expansion wave impulses.

In addition, it should also be noted that it is possible to stabilize the gas bubble 5 elsewhere than at the center of the reservoir 2, e.g. in the vicinity of its walls, by using a geometrical shape of the reservoir 2 and/or waveforms suitable for generating acoustic antinodes at the desired location.

It is also possible to stabilize a plurality of gas bubbles 5 in the reservoir 2, also by choosing a suitable geometrical shape for the reservoir 2 and/or suitable waveforms. In which case the transducers T1–T8 may be controlled so that they focus successively and/or simultaneously onto the various gas bubbles 5.

Finally, it is optionally possible to replace the compression wave impulses S2 entirely with the above-mentioned expansion wave impulses S3, synchronized with the deformation cycle of the gas bubble 5 so as to reach said gas bubble during an expansion stage.

The invention claimed is:

1. A method of generating photons by sonoluminescence, said method comprising at least the following steps:
   (a) generating at least one standing acoustic wave (S1) in a liquid reservoir (2), said standing acoustic wave having at least one antinode;
   (b) trapping at least one gas bubble (5) in the liquid at said antinode of the standing acoustic wave, said gas bubble then being subjected to a periodic deformation cycle comprising expansion stages (10) and contraction stages (12) in alternation; and
   (e) generating acoustic wave impulses (S2) in the liquid, which compression acoustic wave impulse are superposed on the standing acoustic wave (S1), and cause photons to be emitted by the gas bubble, by sonoluminescence;
   said method being characterized in that the acoustic wave impulses (S2) are caused to be emitted by a number n at least equal to 2 of impulse firing transducers (T1–T8) disposed around the gas bubble (5);
   in that a focusing training step (c) and a synchronization step (d) 0 are interposed between the steps (b) and (e); and
   in that, during the focusing training step (c), the impulse firing transducers are caused to emit acoustic wave impulses (S2) with a first amplitude that is sufficiently small to avoid disturbing significantly the position and the deformation cycle of the gas bubble (5), acoustic signals generated by said acoustic wave impulse in the liquid reservoir are measured, and time offsets are deduced therefrom to be applied to respective (T1–T8) so as to focus said acoustic wave impulses onto the gas bubble (5);
   in that, during the step (d), instants at which acoustic wave impulses (S2) are emitted by the various impulse firing transducers (T1–T8) are determined so that each wave impulse (2) generated by the impulse firing transducers reaches the gas bubble (5) either during a contraction stage if the wave impulse is compression wave, or during an expansion stage if the wave impulse is an expansion wave; and
   in that, during the step (e), the impulse firing transducers (T1–T8) are caused to generate the acoustic wave impulses at the respective emit instants determined at the step (d), with a second amplitude that is large than the first amplitude.

2. A method according to claim 1, in which the step, (c) comprises the following sub-steps;
   (c1) each impulse firing transducer (T1–T8) is caused to emit an acoustic wave impulse (S2) in succession, with said first amplitude;
   (c2) after each acoustic wave impulse emission, each impulse firing transducer 9T1–T8) is caused to measure the acoustic signals $S3_{ij}(t)$ generated by said acoustic wave impulse propagating in the liquid reservoir (2), and said measured signals are stored, I and J being indices respectively designating the impulse firing transducer that emitted the acoustic wave impulse and the impulse firing transducer that received the acoustic wave impulse corresponding to each measure signal $s3_{ij}(t)$; and
   (c3) at least on the basis of said measured signals $s3_{ij}(t)$, said time offsets to be applied to respective ones of the acoustic wave impulses generated by the ones of the acoustic wave impulses generated by the various impulse firing transducers (T1–T8) are determined so as to focus said acoustic wave impulses onto the gas bubble (5).

3. A method according to claim 2, in which, during the sub-step (c3), travel times taken by the acoustic wave impulses to travel between each impulse firing transducer (T1–T8) and the gas bubble are determined, and said time offsets to be applied to respective ones of the acoustic waves generated by the various impulse firing transducers so as to focus said acoustic wave impulses onto the gas bubble are deduced from said travel times.

4. A method according to claim 2, in which a preliminary calibration step (a0) is performed, at least before the step (b), said calibration step comprising the following sub-steps:
   (a01) each impulse firing transducer (T1–T8) is caused to emit an acoustic wave impulse (S2) in succession, with said first amplitude;
   (a02) after each acoustic wave impulse emission, each impulse firing transducer (T1–T8) is caused to measure acoustic signals $s1_{ij}(t)$ generated by said acoustic wave impulse propagating in the liquid reservoir (2), and said measured signals $s1_{ij}(t)$ are stored;
   during step (c) each impulse firing transducer (T1–T8) is caused to listen to the acoustic signals $s2_j(t)$ received while the standing acoustic wave is being emitted in the presence of the gas bubble (5);
   and during the sub-step (c3), corrected signals $s_{ij}(1) - s3_{ij}(t) - s1_{ij}(t) - s2_j(t0$ are calculated, and then said time offsets are determined on the basis of the said corrected signals.

5. A method according to claim 4, in which said time offsets are determined by cross-correlation between said corrected signals.

6. A method according to claim 1, in which n is at least equal to 8.

7. A method according to claim 1, in which the acoustic wave impulses (S20 are compression acoustic wave impulses, and, during the step (d), emit instants are determined at which the compression acoustic wave impulses (S20 are emitted by the various impulse firing transducers (T1–T8) so that each compression acoustic wave impulse (S2) generated by the impulse firing transducers reaches the gas bubble (5) during a contraction stage.

8. A method according to claim 7, in which, during step (d), emission of the compression acoustic wave impulse by the various impulse firing transducers is synchronized with the deformation cycle followed by the gas bubble so that said compression acoustic wave impulses generate an increase in the pressure of the liquid surrounding the gas bubble at least until the end of the said contraction stage.

9. A method according to claim 7, in which, during step (d), emission of the compression acoustic wave impulses by the various impulse firing transducers (T1–T8) is synchronized with the deformation cycle followed by the gas bubble, so that each compression acoustic wave impulse generated by the impulse firing transducers reaches the gas bubble (5) substantially when said gas bubble has its maximum diameter.

10. A method according to claim 7, in which the compression acoustic waves (S2) generate acoustic vibration of the amplitude at least equal to 8 bars in the liquid in the vicinity of the gas bubble (5).

11. A method according to claim 7, in which, during step (e), the compression acoustic wave impulse (S2) coming from each impulse firing transducer (T1–T8) is caused to be preceded immediately by an expansion acoustic wave impulse (S3) which is adapted to reach the gas bubble (5) during the expansion stage (10) preceding the contraction stage (12) during the which said gas bubble receives the compression acoustic wave impulses.

12. A method according to claim 1, in which the standing acoustic wave (S1) is caused to be generated by at least two standing wave generation transducers (T'1, T'2) distinct from the impulse firing transducers (T1–T8).

13. A method according to claim 1, in which the standing acoustic wave (S1) is an ultrasound wave of frequency lying in the range 20 kHz to 30 kHz and of amplitude in the vicinity of 1.3 bars.

* * * * *